US010853090B2

(12) United States Patent
Jacquin et al.

(10) Patent No.: US 10,853,090 B2
(45) Date of Patent: Dec. 1, 2020

(54) INTEGRITY VERIFICATION OF AN ENTITY

(71) Applicant: HEWLETT PACKARD ENTERPRISE DEVELOPMENT LP, Houston, TX (US)

(72) Inventors: Ludovic Emmanuel Paul Noel Jacquin, Bristol (GB); Hamza Attak, Bristol (GB); Nigel Edwards, Bristol (GB); Guilherme de Campos Magalhaes, Porto Alegre (BR)

(73) Assignee: Hewlett Packard Enterprise Development LP, Houston, TX (US)

( * ) Notice: Subject to any disclaimer, the term of this patent is extended or adjusted under 35 U.S.C. 154(b) by 193 days.

(21) Appl. No.: 15/876,370

(22) Filed: Jan. 22, 2018

(65) Prior Publication Data
US 2019/0227810 A1   Jul. 25, 2019

(51) Int. Cl.
| | | |
|---|---|---|
| *G06F 9/445* | (2018.01) | |
| *G06F 9/30* | (2018.01) | |
| *G06F 21/57* | (2013.01) | |
| *H04L 29/08* | (2006.01) | |
| *G06F 21/44* | (2013.01) | |

(52) U.S. Cl.
CPC ............ *G06F 9/445* (2013.01); *G06F 9/30* (2013.01); *G06F 21/44* (2013.01); *G06F 21/572* (2013.01); *H04L 67/10* (2013.01)

(58) Field of Classification Search
CPC .......... G06F 9/445; G06F 9/30; G06F 21/572; G06F 21/44; H04L 67/10
USPC ....................................................... 713/187
See application file for complete search history.

(56) References Cited

U.S. PATENT DOCUMENTS

| | | | | |
|---|---|---|---|---|
| 7,917,752 | B2 * | 3/2011 | Proudler | G06F 21/6227 |
| | | | | 713/165 |
| 8,468,356 | B2 * | 6/2013 | Sahita | H04L 9/0841 |
| | | | | 713/176 |
| 9,582,513 | B2 * | 2/2017 | Pletcher | G06F 16/13 |
| 10,033,756 | B1 * | 7/2018 | Rangarajan | H04L 63/1433 |
| 10,460,130 | B1 * | 10/2019 | Chhabra | H04L 9/3247 |

(Continued)

FOREIGN PATENT DOCUMENTS

| | | |
|---|---|---|
| CN | 105069353 A | 11/2015 |
| CN | 102662871 B | 5/2016 |

(Continued)

OTHER PUBLICATIONS

Josh Wood, "Distributed Trusted Computing," Technical Brief, Dec. 2, 2015, pp. 1-6, Tectonic.

(Continued)

*Primary Examiner* — David J Pearson
*Assistant Examiner* — Badri Champakesan
(74) *Attorney, Agent, or Firm* — Hewlett Packard Enterprise Patent Department

(57) ABSTRACT

Examples relate to integrity reports. In an implementation, an entity for executing a function is launched, the entity operating one or more files for executing the function. In response to the entity being launched, an entity image integrity report is generated comprising, for one or more files operated by the entity, a reference to the file measurement in a first integrity report the first integrity report containing measurements of a plurality of files operable in one or more entities. Alternatively, in response to the entity being launched, an entity integrity report is generated comprising a file measurement for each of the files operated by the entity.

19 Claims, 4 Drawing Sheets

(56) References Cited

U.S. PATENT DOCUMENTS

| | | | | |
|---|---|---|---|---|
| 2005/0060579 | A1* | 3/2005 | Dickelman | H04L 63/1408 726/4 |
| 2005/0132122 | A1* | 6/2005 | Rozas | G06F 21/57 711/100 |
| 2005/0283601 | A1* | 12/2005 | Tahan | G06F 21/575 713/2 |
| 2007/0038964 | A1* | 2/2007 | Zeng | G06F 30/33 716/112 |
| 2008/0015808 | A1* | 1/2008 | Wilson | G06F 21/54 702/123 |
| 2008/0134321 | A1* | 6/2008 | Rajagopal | G06F 21/6281 726/21 |
| 2014/0129519 | A1* | 5/2014 | Leshchiner | G06F 16/273 707/613 |
| 2017/0300309 | A1* | 10/2017 | Berger | G06F 8/61 |
| 2018/0365424 | A1* | 12/2018 | Callaghan | G06F 21/575 |
| 2019/0114431 | A1* | 4/2019 | Cheng | G06F 21/575 |

FOREIGN PATENT DOCUMENTS

| | | | | |
|---|---|---|---|---|
| WO | WO-2014088395 A1 * | 6/2014 | | G06F 21/562 |
| WO | 2017/111843 A1 | 6/2017 | | |

OTHER PUBLICATIONS

Raghu Yeluri and Abhishek Gupta, "Trusted Docker Containers and Trusted VMs in OpenStack," 2015, pp. 1-16, Intel Corporation.

European Search Report and Search Opinion Received for EP Application No. 19153133.4, dated Jun. 17, 2019, 6 pages.

Berger et al. "vTPM: Virtualizing the Trusted Platform Module", Security '06: 15th USENIX Security Symposium, USENIX Association, 2006, pp. 305-320.

Arnautov et al., "SCONE: Secure Linux Containers with Intel SGX", 12th USENIX Symposium on Operating Systems Design and Implementation, USENIX Association, 2016, pp. 689-703.

* cited by examiner

INTEGRITY VERIFICATION OF AN ENTITY

BACKGROUND

Server-less computing relates to a cloud computing model which provides the capability to create services by assembling the desired functions on demand. In server-less computing, a server provider manages allocation of machine resources dynamically, and server management decisions can be hidden from developers or operators of software applications.

Server-less computing can include hosts which run programs and provide functionality to a plurality of clients simultaneously. Applications can be built to run in a server-less computing environment, where the application may be initiated when desired and removed when no longer desired. These applications may be packaged into self-contained entities which run on top of software provided at the server. The term "container" may be used to refer to an example of an entity which groups a set of processes. It is desirable to be able to determine the integrity of such applications.

BRIEF INTRODUCTION OF THE DRAWINGS

Examples of the disclosure are further described hereinafter with reference to the accompanying drawings, in which.

DETAILED DESCRIPTION

Figure 1:
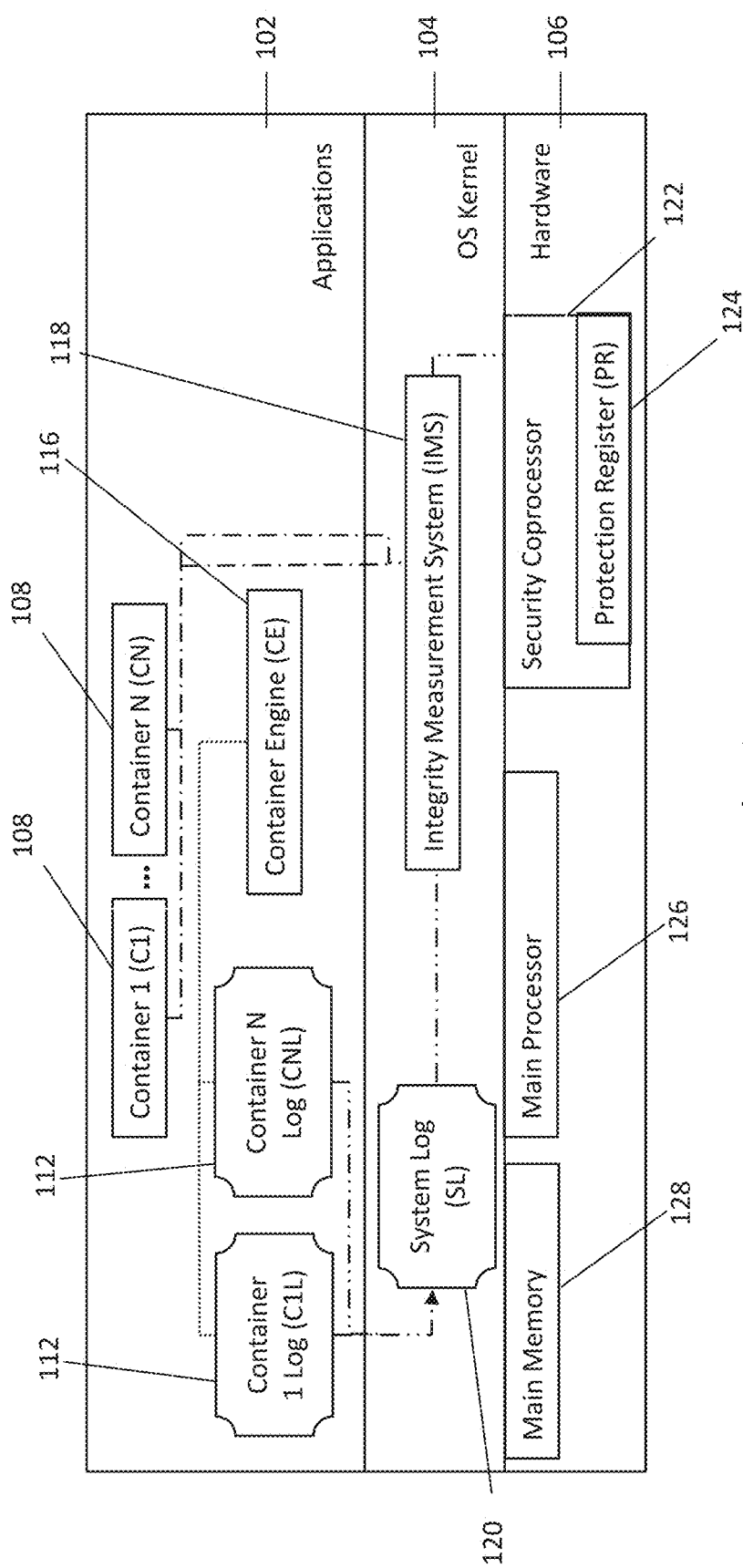
FIG. 1 is a system architecture diagram showing an example system for verifying the integrity of an entity.

In server-less computing, services may be created by assembling the desired functions on-demand. Containers may be used to execute the functions. Containers are an example of an entity in which a collection of one or more processes are grouped together, for instance by the Operating System, OS. In some cases, the grouping mechanism is such that all processes share one or more operating system artifacts intended for constraining, and therefore containing, process behavior. Examples of these operating system artifacts include, but are not limited to: process namespace, mount namespace and network namespace.

Containers offer a quick launch capability that may not be provided by alternative computing paradigms. However, the skilled person would understand that alternatives such as virtual machines, FreeBSD jails or Solaris Zones may benefit from the methods discussed herein. Specifically, the measurement and verification examples presented herein are widely applicable beyond containers or similar entities. Although server-less computing is referred to herein in connection with certain examples, this is to provide an example of a suitable computing environment. Verification of files may be desirable in a variety of computing environments, whether the files are operated on by a container in a server-less computing system, or in another manner.

Application developers may deploy applications by developing the software of the application and providing it to a server-less computing provider. The application may then be invoked or executed according to demand for the application. The combination of server-less computing and containers may be employed to quickly scale resources when demand for an application increases, as new instances of the application can be generated in new containers according to demand. Containers may also be created to perform a single associated function, and may operate on a subset of files stored in the system for executing the function.

It may be desirable for the integrity of applications to be verified. This may also be known as container verification when applications are run within containers, or more generally may be referred to as attestation, and the terms verification and attestation (and their derivatives are used interchangeably herein, with no intended difference in meaning). The verification or attestation process may involve checking that files are updated to the correct version, that the correct files have been used, and that files are not corrupted or have not been tampered with. This is intended to ensure the application behaves as expected. Attestation is the process of a program authenticating its integrity to certify that it is correct and has not been tampered with.

An example of a system for verifying applications comprises an application layer, an operating system (OS) layer, and a hardware layer. At the application layer, the system may create one or more entities for executing one or more functions. The entity may be a container, which may operate on one or more files to execute the function. The files may be stored in any suitable storage, for example a hard drive on the server, and may be used by the OS.

The containers may be created and launched in response to a request for executing the function associated with the container. In a server-less computing environment, containers may be managed and launched on hardware provided by the server-less computing provider.

The OS layer may comprise an OS. The OS is responsible for managing system resources and may provide common services or functions to applications running in the application layer. The OS may enable the running of applications in the application layer by interfacing between the application layer and the hardware layer. The majority of commercially available computing devices are operated by an OS. There exists a range of commercially available OSs which are programmed to behave and be operated differently. Further, some OSs may be designed differently for different types of devices. The skilled person would appreciate that the methods and devices discussed herein may be performed on any OS that supports measurement of files.

The OS in the OS layer may also perform integrity checks on applications running in the application layer. The integrity checks may be performed by an Integrity Measurement System (IMS) which may form part of the OS, and which may measure files to obtain a numerical value for comparison with a known or expected value for the file. An example of performing the measurement of the file may be for the IMS to execute a hashing function to generate a hash value of the file.

The hash values from the measurement may be stored in storage in the system. The measurement may be logged in a system wide log or register which contains measurements of all the files in the system. In an alternative example, the IMS may generate a log of a particular group of files in the system, that may not include all files in the system. For example, the IMS may generate a log containing measurements of files operated on or associated with a plurality of related containers.

An example of an OS that may perform measurements of files and store the file measurements in a system wide integrity register or system log is the Linux OS. In some implementations of a Linux OS, measurements of all files in the system may be taken when the file is accessed for the first time. This file measurement may be stored in a system wide integrity register (also referred to as a protection register) which may include measurements of all files in the system. For example, a Linux kernel may include an integrity measurement extension that supports file name-spacing.

The system log may be protected by hardware in the hardware layer. For example, a Trusted Platform Module (TPM) may be used to protect the system log. TPM is an example implementation of trusted computing. Trusted computing is a technology developed to ensure that a device will behave in the expected way. This is achieved through hardware based enforcement. Typically, a device based on trusted computing will include hardware created with a unique encryption key stored therein, which is inaccessible to the rest of the system. An example of an implementation of trusted computing, or more specifically TPM, may be in a server-less computing environment, in which the server or host platform may comprise a TPM to protect data stored on the server. As the operation of the server may include launching applications in a shared environment, the protection provided by TPM is desirable. This key is created at the time of manufacturing and cannot be changed. The use of trusted computing in computing environments aims to mitigate software based attacks on the system. An encryption key may be stored in the TPM during its manufacture and may be unique to the TPM. This may be used to protect data from software based attacks, by validating data when the correct combination of software and hardware is present. Trusted computing allows remote attestation of programs, in which a system can generate a proof regarding its files and programs and present the proof to a remote party.

The hardware layer may also be an embedded device comprising a TPM. The TPM may include a Platform Configuration Register (PCR), which is an example of the protection register noted above, for storing the measurement values. The process of storing values to the PCR may be known as extending the PCR. The PCR may be a memory location in the TPM in which the size of a value that can be stored in the PCR is determined by an associated hashing algorithm.

Extending the PCR may comprise performing a one-way hash on measurements of the state of files, such that the measurements may be secured in the TPM and cannot be removed. The extension of the PCR may comprise extending the existing stored value with a TPM Extend operation, after which the result may be hashed to generate the new value to be stored in the PCR.

An example of a container verification or attestation process is now described. An application may be requested. In response, an entity, such as a container, for executing the function of the application may be created and launched in the application layer. The entity may operate on at least one file to perform a function. The entity may request access to the measurement of the file in the system log protected by the TPM.

The IMS may be controlled by the OS to measure the at least one file operated on by the entity at the time of launching the entity. The measurement obtained by the IMS may be compared with the system log. If the measurement of the file is not found in the system log, the system log may be updated with the measurement. If the file measurement exists in the system log but the file measurement has changed, the system log may be updated with the new measurement.

Multiple containers may be launched on a single server. In this case, the containers may operate on files common to each other. Therefore, when a container is launched, it is possible that the system log is not updated with measurements of files operated on by the recently launched container if previously launched containers have operated on all of the files operated on by the recently launched container.

The system log may then be updated to the TPM in the case where the system log has changed.

The system may verify a container by verifying or attesting the system log. As an example, this may be performed when the container is generated or on request by a remote verifier or monitoring tool. For example, when the container is generated, attestation procedures may be initiated. The attestation may be performed by a dedicated attestation program. The attestation program may request measurements of all files used by the container, and update the system log containing measurements of files with new measurements if appropriate. The measurements may be protected by the encryption key of the TPM. The attestation program may verify the files by verifying the signature of the TPM, and then comparing the measurement values with known or expected values for the files. The expected values for the files may be looked up in a database, for example.

If the measurements of the files in the system log match the expected values, then the entity is verified and the operator knows that the entity will behave as expected to perform the function.

FIG. 1 illustrates an example of a system architecture of a computing device for verifying the integrity of an entity grouping a set of processes. The system architecture of FIG. 1 comprises an application layer 102, an OS Kernel layer 104 and a hardware layer 106. An example of the type of system represented by FIG. 1 is the server or host platform of a server-less computing provider. The server of the server-less computing provider may be employed to manage and scale computing resources for a plurality of applications or containers simultaneously. The server of the server-less computing provider may therefore be referred to as the attestee; the server running the container that needs to be verified.

The skilled person would understand that the computing device shown in FIG. 1 and the processes and functions associated with each part of the computing device may be formed as a single device, or may be a system in which, for example, a server for running containers communicates with a separate attestation server or monitoring tool.

The example system of FIG. 1 includes a main processor 126 for controlling the functions of the system and a main memory 128 for providing memory to the system.

In the example of FIG. 1, the hardware layer 106 includes a security coprocessor 122 which may be or may include a TPM, for example. The security coprocessor 122 may protect and/or store a Protection Register (PR) 124. The Protection Register is a generic term corresponding to the PCR in the trusted computing terminology, discussed above. The protection register 124 may be secure storage provided for measurements of system files stored in a system log 120. That is, values of file measurements stored in the system log 120 may be hashed and/or stored internally in storage in the protection register 124. In an alternative example, the file measurements may be stored in the main memory 128. Files stored in the main memory 128 may be protected by mechanisms such as encryption. The protection register 124 may be updated by the security coprocessor 122 when the system log 120 is changed.

The system log 120 may also be referred to herein as a system integrity report or first integrity report. As an alternative to a system wide log storing measurements in respect of all files in the system, the first integrity report may contain measurements of a subset of files. For example, a first integrity report may be generated that contains measurements of files used by a particular group of containers 108 or all containers (but excluding files falling outside of the containers or not operated upon by the containers).

In the example of FIG. 1, the protection register 124 is protected by a hardware module such as the security coprocessor 122. However, a person skilled in the art would readily understand that the protection register 124 may be protected through other means. For example, virtual TPM (vTPM) or other software based secure storage may be employed. Some implementations of vTPM may allow for the creation and destruction of multiple virtual TPM instances. In one example implementation, the vTPM may be integrated into a hypervisor environment to make TPM functions available to virtual machines. The virtualisation of TPM may be based on extending a chain of trust from the physical TPM to each instance of the vTPM. The virtualization of TPM may enable multiple entities in a single system to behave as if each entity operates in a system with a physical TPM for each entity, although a single physical TPM may be present.

In the example of FIG. 1, the protection register 124 based on the system log 120 is shown to be protected by the security coprocessor 122, which may be a TPM.

The system log 120 may be included as part of the OS Kernel layer 104. The system log 120 may be managed by an Integrity Measurement System (IMS) 118. The IMS 118 may measure files in the system and update the system log 120 with new measurements of files. This may be performed when the files are accessed by a container 108 for the first time, or at the boot up time of the server, for example. The IMS 118 may measure files when a container 108 is launched. The IMS 118 may update the system log 120 when a measurement of a file is not found in the system log 120 or when a file has been changed.

The system log 120 may include a file measurement obtained by the IMS 118 for each file in the system, or for a subset of files in the system.

The measurement of the files may be based on a hashing process for example. The system log 120 containing measurements of the files in the system may be stored in storage in the system, and may be secured by a variety of techniques, including techniques based on the TPM, as discussed above.

The application layer may include a number of containers 108. There may be a plurality of containers to provide the processes, not limited to the example of two which is illustrated in FIG. 1. There may also be a single container 108. A container such as container 108 is an example of an entity that groups a set of processes for the purpose of executing a function. The container 108 may operate one or more files for executing the function. In the figures provided, containers (C) may be numbered as C1 . . . CN, where N is an integer counter.

The containers 108 may be managed by the container engine (CE) 116. The container engine 116 may create and launch a container 108 according to requests for the container 108 function. This is not illustrated in the example of FIG. 1, which is limited to process flows relating to integrity verification. The container engine 116 may be software installed and operated on the server or other host platform where the containers 108 are run. Container engines may be available commercially, but the example system of FIG. 1 is not limited to any particular container management implementation. The container engine 116 of FIG. 1 may represent any software or hardware elements that are capable of launching or managing containers, or creating or updating container logs.

The container engine 116 may launch a container 108 in response for a request for the function performed by the container 108 to be executed. The container 108 may be deleted when the container 108 has completed the execution of its associated function.

The container engine 116 may also generate a container log 112 for each container 108. A container log 112 associated with container C1 may be identified by the notation "C1L". The container log 112 may also be known as a container image integrity report (or container image IR) or an entity image integrity report (or entity image IR). The container log 112 may record which files are operated on by the container 108 and contain references to entries for each file measurement in the system log (SL) 120 (a system integrity report). That is, a container log 112 may be generated for each container 108, and the container log 112 may contain references to the file measurements in the system log 120, for the files operated on by the container 108 associated with the container log 112. The container log 112 may not store the measurement value itself, but may instead store a reference pointing to the entry in the system log 120 for the measurement of a particular file. If there is no file measurement for a file in the system log 120, the file may be measured by the IMS 118 and the measurement may be stored in the system log 120 or directly in the container log 112.

In an alternative example, the container log 112 may be updated with measurements of files operated on by the container 108 that are not stored within the system log 120 by the IMS 118. For example, in some operating systems, particular types of files may not be measured, or files that are not used may not be measured and therefore measurements for some files may not be stored in the system log 120. The IMS 118 may measure any file in the system and the measurement may be stored in the container log 112. As another example, the container log 112 may store measurements for all files operated on by the container 108.

The container engine 116 may create a container log 112 for each container 108 when the container 108 is launched. The container log 112 may be preserved either locally in the same system or device as the container engine 116 launches the container 108, or may be preserved remotely. Preservation of the container log 112 may be desirable, as it enables verification of container 108 execution after the container 108 has been terminated. Alternatively, the container log 112 may be destroyed or discarded at any time after the container 108 has been destroyed.

Attestation may be performed on the containers 108 by comparing the container log 112 to a list of files expected to be operated on by the container 108. For example, the container log 112 may be compared to a Known Good State of the container 108. The Known Good State may be accessed from a separate database, not illustrated in FIG. 1. Comparing the files operated on by a container 108 with a list of files expected to be operated on by the container 108 allows a verifier to verify that the container 108 has operated on the correct files.

The integrity of the containers 108 may be verified by first verifying the system log 120 (which, as noted above, may be referred to as a system integrity report or a first integrity report). To verify the system log 120, the verifier may compare the measurements of each file in the system log 120 with a measurement of a known or trusted version of the same file. This may be stored in a separate database and looked up, or may be stored in the same device.

The verification of the system log 120 is performed to verify that a plurality of files with file measurements stored in the system log 120 are correct. Once this has been performed, the attestation of individual containers 108 may be performed without repeating the measurement of each individual file operated on by the container 108. This reduces the processing overheads for verifying a container compared to processes that measure each file operated on by the container. This benefit is compounded by the nature of server-less computing in which a plurality of containers 108 may be launched, where the containers 108 may operate on common files.

A verifier may also verify a container 108 individually as a result of container log 112 acting as a record of which files have been used by a container 108. If a container log 112 is not created, in order to verify a container 108 a verifier may first need to verify the entire platform, because if measurements of files are produced the first time a file is used, file measurements may not be taken for files operated on by a container 108 if the files have been used by previous containers. For example, if container C1 operates on file F1, container C2 operates of file F2, and container C3 operates on both files F1 and F2, then if C3 is executed after C1 and C2 have been run, nothing will be added to the system log as all files operated on by C3 have already been measured.

Attestation may be performed locally or remotely. Attestation may be performed when a container 108 is launched by the container engine 116, or on demand by a verifier or monitoring tool.

Figure 2:
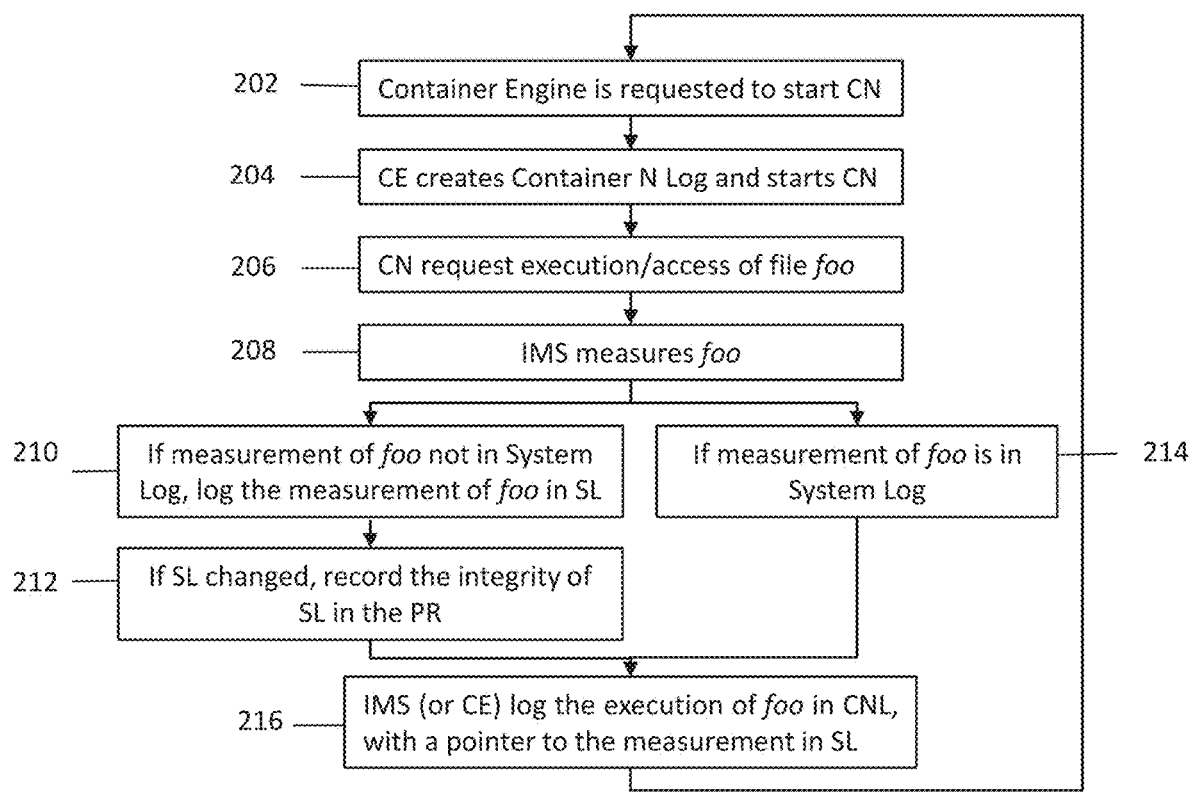
FIG. 2 is a flowchart showing an example method for enabling verification of an entity.

FIG. 2 is a flowchart illustrating an example method for the generation of a container log 112.

At reference 202, the container engine 116 is requested to start a container N (CN).

At 204, the container engine 116 launches the container CN and creates a container log CNL associated with the container CN. As with FIG. 1, in the example of FIG. 2, the container log CNL may contain references to file measurements stored in a separate system log or system integrity report. The container log CNL of FIG. 2 may otherwise be known as a container image IR or an entity image IR.

At 206, the container CN operates on a file. For example, the container CN may request access to a file or request the execution of a file, for instance file foo, which may be stored on the server or host platform. Each container 108 may operate on a predefined selection of files in order to execute the function associated with the container 108.

At 208, the IMS 118 measures the file operated on by the container CN, and determines if the measurement of the file exists in the system log 120. The measurement of the file may correspond to a cryptographic record of the state of the file. In the example illustrated in FIG. 2, the measurement of the file may indicate if the file has been measured before, as the measurement value itself may indicate a file in the system log 120.

If the measurement of the file is not found in the system log 120, at 210 the method further comprises logging the measurement of the file in the system log 120. The measurement of the file may also be logged in the system log 120 if the file has changed since it was previously measured.

The example method of FIG. 2 begins at the stage of a container engine 116 being requested to launch a container 108. Prior to this a system log 120 containing measurements of files in the system may have already been generated, or files may have been measured after being accessed by other containers. However, if no system log 120, or first integrity report (first IR) exists, then at 208 the IMS may generate a system log 120 or first IR to be stored in the system.

At 212, it is determined if the system log 120 has changed. If the system log 120 has changed, the integrity of the system log 120 is stored in the first protection register, PR 124. Storing the integrity of the system log 120 in the first protection register, PR may include protecting the system log in a TPM by extending the PCR.

The skilled person would understand that TPM is an example of securing or protecting the data of the system log 120 and file measurements, and that this could be achieved by alternative means.

At 214, if the measurement of the file is found in the system log 120, the system log 120 is not updated.

At 216, the container log CNL 112 is updated with a reference or pointer to the measurement of the file in the system log 120. This may be performed whether the system log 120 has been updated or not or whether the measurement of the file is found in the system log 120 or not.

The reference logged in the container log 112 may not be the value of the measurement, but may be an indicator which directs a verifier to the correct part of the system log 120 which contains the measurement for that file. In an alternative example, the container log 112 may also store the measurement value.

The container log 112 may be updated by the IMS 118 or the container engine 116. The skilled person would understand that the container log 112 may be updated by any appropriate part of a system with access to the container log 112.

The example method of the flowchart of FIG. 2 may be terminated when the container 108 is terminated. If the container 108 operates on any new files during the lifetime of the container 108, the new files may be measured by the IMS and the measurement stored in the system log 120, container log 112, or both. The container log 112 may be updated with a reference to the measurement of the new file in the system log 120 or the first IR.

In the example of FIG. 2, the protection register, PR, is updated if the system log 120 has changed, due to a measurement of a file being obtained by the IMS 118 which did not previously exist in the system log 120. The processing overheads of the system may be reduced as the protection register is accessed or updated when a new measurement is obtained. This may be desirable in some examples, such as some of those disclosed herein, where the protection register is hardware protected, such as by a TPM, as TPM may not be performance orientated. In particular, this may be desirable when performing attestation, as in combination with the use of container log 112, a verifier may verify a container 108 individually without incurring performance penalties associated with TPM.

In alternative examples, instead of measuring the file every time at 208 of FIG. 2, the system or the IMS 118 may for example access a database in which is recorded a list of files known to have been measured to determine if particular file foo has been measured previously.

Figure 3:
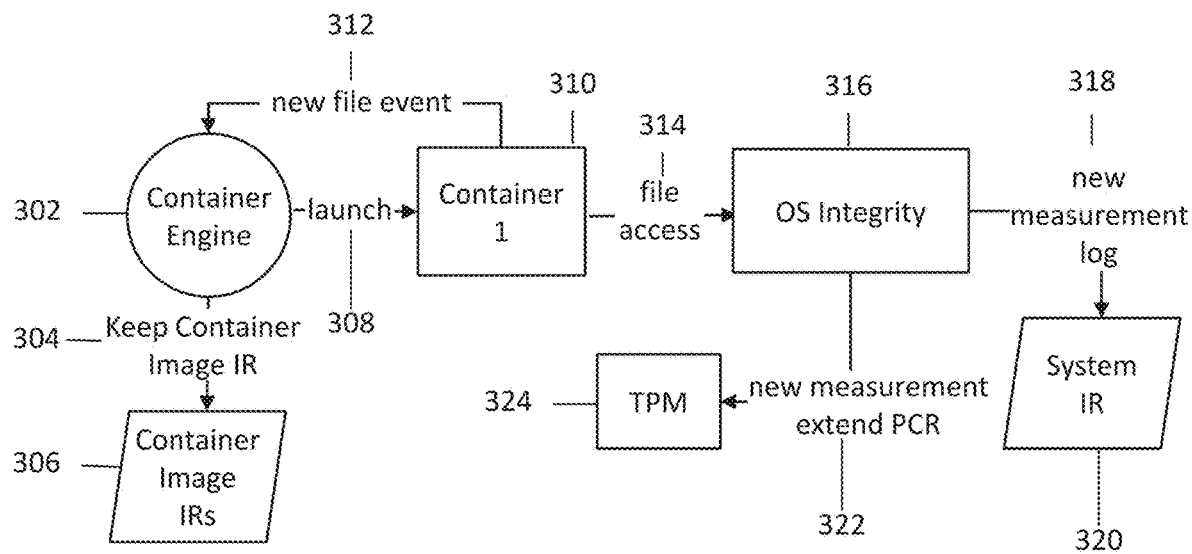
FIG. 3 is a logic diagram showing an example of modules performing associated functions to generate a container image integrity report (IR), in the case of a single system Integrity Report being stored in a system.
Figure 4:
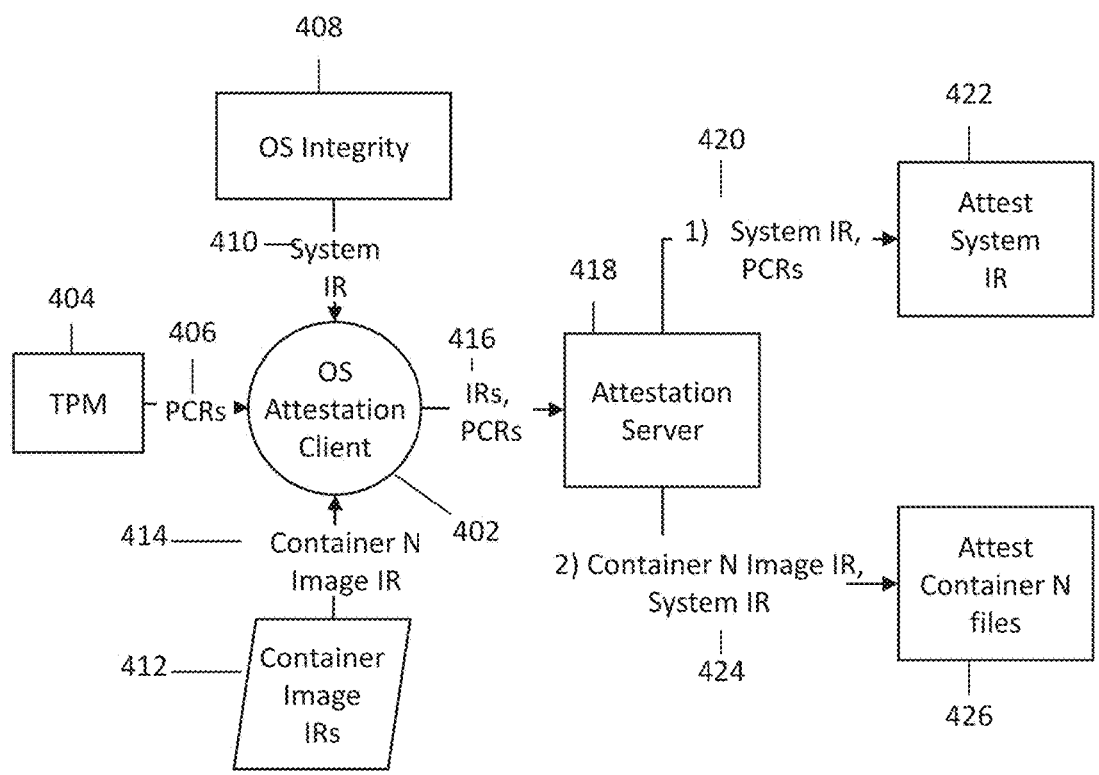
FIG. 4 is a logic diagram showing an example of modules performing associated functions to verify a container in the case of a single system Integrity Report being stored in a system.

FIGS. 3 and 4 are logic diagrams showing example integrity report, IR, generation and container attestation processes respectively. In FIGS. 3 and 4 the acronym IR should be interpreted as meaning integrity report. The system IR 320, described below, corresponds to the system log 120 of FIGS. 1 and 2. Similarly, the container image IRs 306, described below, correspond to the container logs 112 of FIGS. 1 and 2. In each case, "container" is a specific example of the broader term "entity", in the sense of a set of processes grouped together, for instance by the OS. FIGS. 3 and 4 differ from FIGS. 5 and 6, discussed later, mainly in that they illustrate processes for integrity report, IR, generation and container attestation in the case where a single first IR, or system IR, is generated and a respective single TPM is available, and references to measurements stored in the first IR are logged in a container image IR.

Turning to FIG. 3, a container engine 302 may launch 308 a first container 310. The skilled person would understand that the container 310 is provided as an example of an entity grouping a set of processes.

FIG. 3 illustrates an example method for integrity verification of a container grouping a set of processes. The method comprising launching a container 310 for executing a function. Container 310 operates one or more files for executing the function. In response to launching the container 310, a container image integrity report 306 is generated. The container image integrity report 306 comprises, for one or more files operated by the container 310, a reference to a file measurement in a system integrity report 320. The system integrity report 320 contains measurements of a plurality of files operable in one or more containers.

The container 310 may request 314 access to a file from the OS. The OS may comprise components for performing integrity related processes, such as the IMS 118. An OS integrity module 316 measures the file and logs 318 the new measurement in a system integrity report, IR 320. The system IR 320 comprises a single first IR which may be referenced by multiple container image IRs. As described above, the system IR 320 may comprise measurements of all files in the system, or may comprise measurements of only a subset of files in the system.

The OS integrity module 316 may also extend 322 a protection register, such as a PCR, in TPM 324 with the new measurement. As described above, this may be performed based on a hashing function. The hashing function may serve to update the hash already stored within the TPM in respect of the measurements previously stored within system IR 320 using the new measurement. Although FIG. 3 refers to a physical TPM 324, the skilled person would understand that any other hardware or software based protection or storage may be employed. For example, the measurement may be encrypted in a software based mechanism.

The container engine 302 of FIG. 3 may also keep 304 a container image IR in a collection of container image IRs 306. The container image IR may contain a reference to the measurement value of a file in the system IR 320.

The container 310 may access a new file. The container engine 302 may be notified of the new file event 312 and may update the container image IR with information regarding the new file. That is, the container engine 302 may update the container image IR with a reference to the new file measurement stored in the system IR 320, corresponding to the file operated on by the container 310 in the new file event 312.

Turning to FIG. 4, an example attestation process is illustrated. The attestation process of FIG. 4 is an example of an attestation process in the case where single system integrity report, IR, (first IR) exists, for example as generated by the logic diagram of FIG. 3.

In FIG. 4, an OS attestation client 402 may receive 406 PCR stored measurements from a TPM 404. The OS attestation client 402 may receive 410 a system integrity report, IR, from an OS integrity module 408. The OS attestation client 402 may receive 414 a container image integrity report, IR, for a particular container from a group of container image IRs 412.

The container image IR of FIG. 4 comprises references to file measurements for files operated by the container, where the file measurements are stored in the system IR 410. The container image IR of FIG. 4 may otherwise be known as an entity image IR.

As described above, a system IR is provided as an example, but alternatively the OS Integrity module 408 may generate and provide to the OS attestation client 402 a first integrity report, IR, comprising measurements of a different set of files to those of the system IR 410. For example, the first IR may include measurements of a subset of files operated on by a particular container or group of containers.

The OS attestation client 402 may communicate with an attestation server 418 and may transmit 416 the IRs and PCR measurements to the attestation server 418.

The OS attestation client 402 may be software for performing the attestation process. The entity being attested by the attestation server may be referred to as the attestee. The OS attestation client 402 may be implemented on the server running the container 310 to be verified. The OS attestation client 402 may interface between the hardware of the system which may protect measurements and integrity reports IRs, and software elements of the system. Alternatively, the measurements and Irs may be protected with software based techniques.

The attestation server 418 may be a separate device to the device which launches and runs containers, a device on which the OS attestation client 402 is run, or both. Alternatively, these may all be part of a single computing device.

The attestation server 418 may attest 422 the system IR (the attestee), by comparing 420 the system IR and PCRs. As an example, the system IR may be processed through a hashing function to obtain a value. This value may be compared with a value stored in the PCR. Based on this comparison, the attestation server 418 may decide if the measurements in the system IR of files in the system are correct.

The attestation server 418 may also attest 426 container files, by comparing 424 a container Image IR (the attestee) with the system IR. The attestation server 418 may compare the container Image IR with the system IR to check if the container has operated on files that have been verified by attesting the system IR. The container Image IR may be verified if the files used by the container have all been verified by attesting the system IR.

The attestation server 418 may also attest 426 container files by comparing the files referenced in the container Image IR with a list of expected files to be operated on by the container. For example, the attestation server 418 may compare the files operated on by the container with a Known-Good state of the container. The Known-Good state of the container can be generated from an image of the container stored on a container hub, for example. The Known-Good state of the container may contain information about which files are expected to be operated on by the container. As an alternative to receiving information relating to a Known-Good state from a different device, the attestation server 418 may store the information itself, or may transmit the container image IR to another device to perform the comparison.

Figure 5:
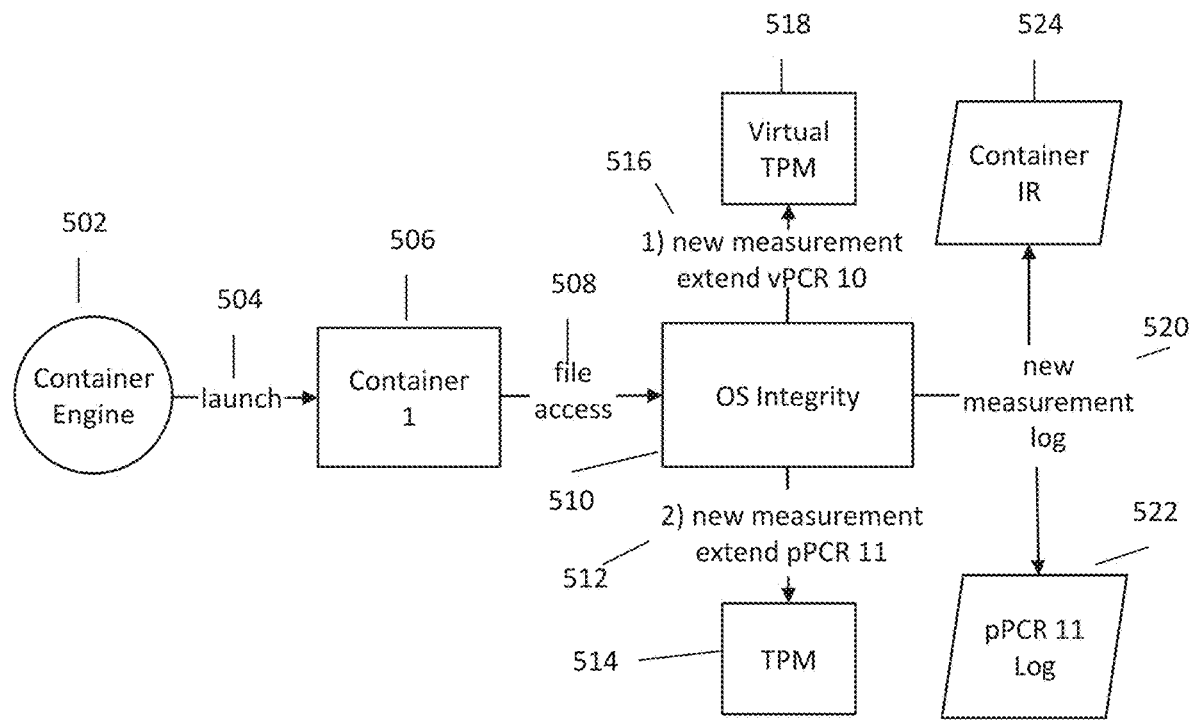
FIG. 5 is a logic diagram showing an example of modules performing associated functions to generate a container Integrity Report for each container launched in a system.

FIG. 5 is a logic diagram showing an example of modules performing associated functions to generate a container integrity report, IR, for a container 1 launched by a container engine 502, wherein the container IR may comprise file measurements of files operated on by the container. Throughout the description of FIGS. 5 and 6 the acronym IR refers to an integrity report. It will be understood that the process of FIG. 5 may be replicated for multiple launched containers. The skilled person would understand that the container 506 is provided as an example of an entity grouping a set of processes.

FIG. 5 illustrates an example method for integrity verification of a container grouping a set of processes. The method comprising launching a container 506 for executing a function. Container 506 operates one or more files for executing the function. In response to launching the container 506, an container integrity report 524 is generated corresponding to the launched container 506, the container integrity report 524 comprising a file measurement for each of the files operated by the container.

In the example of FIG. 5, the container IR 524 may contain measurements of files operated by the container, and no other file measurements. The container IR of FIG. 5 may otherwise be known as an entity IR. In the example of FIG. 5, the container IR may be used as an alternative to the container image IR and system IR of FIGS. 3 and 4. In this respect, the container IR 524 performs a similar role to the system IR 320 of FIG. 3 in that it stores the actual measurement values in respect of those files accessed by the particular container, the difference being that there may be a separate container IR per container storing those measurements. In other examples, the entity (container) IR may not comprise file measurements of files other than those operated on by the respective entity (container). Accordingly, it will be understood that an entity IR is distinguished from the first IR or system IR discussed above in connection with FIGS. 3 and 4 which stores file measurements for files which may be accessed or operated on by multiple containers, such that measurements may be included that are irrelevant to the set of files operated on by any given container.

In FIG. 5, a container engine 502 launches 504 a container 506. The container 506 may be launched in response to a request for a particular function executed by the container 506. The request may arise from an increase in the demand for the function, for example, or a change in desired computing resources of an operator using the server.

The container 506 may request file access 508 from the operating system, OS. The OS may comprise components for performing integrity related processes, such as the IMS 118. The OS integrity module 510 may perform a measurement of the file accessed by the container 506.

The OS integrity module 510 generates a container IR 524 in respect of the launched container 506. The container IR, as noted above, serves to store the actual file measurements 520 for files accessed by that container. The OS integrity module 510 may also update a virtual TPM 518 by extending 516 a virtual PCR (vPCR 10, for example, although the skilled person would understand that any vPCR could be used) with the new measurement. The process of updating the vPCR may be the same as that described above in connection with step 322 of FIG. 3.

The OS integrity module 510 further updates a pPCR 11 log 522 with the file measurement 520 in respect of the file accessed by the container 506. That is, the pPCR 11 log 522 also stores file measurements but differs from the container IR 524 in that it stores file measurements in respect of files accessed by multiple (or all) containers. In this respect, the pPCR 11 log 522 may be considered to form a first IR or a system IR and so equates to the system IR 320 of FIG. 3. The OS integrity module 510 may also update the TPM 514 by extending 512 the new measurement to a physical PCR (pPCR 11, for example, although the skilled person would understand that any pPCR could be used). That is, the pPCR 11 stored in TPM 514 may comprise a hash of the file measurements stored in pPCR 11 Log 522.

The physical PCR and virtual PCR may be employed alone or in combination. The skilled person would understand that examples provided of physical and virtual TPMs and PCRs should not be limiting, as any suitable data protection means could be employed for this purpose. The system may also employ both virtual TPM 518 and physical TPM 514.

The figures reference particular vPCR and pPCR numbers, but this is provided as an example. The skilled person would understand that any vPCR and pPCR can be used.

According to an example, for each container there is a container integrity report 524 and a virtual TPM 518 along with the pPCR 11 log and the physical TPM. Differing from FIG. 3, the container IR 524 does not include an explicit reference to another IR but implicitly each file measurement in the container IR 524 is also present in the pPCR 11 Log 522 (and protected by the pPCR 11 stored in the TPM 514). When attesting the container files (described in more detail in connection with FIG. 6, below) the first step comprises validating the measurements stored in the pPCR 11 log 522 by checking the aggregated integrity values against the physical PCR. If validated, the container IR is cross-referenced with the PCR log and also validated with the virtual TPM. If the container IR is consistent, finally, the file measurement entries in the container IR are used to verify the container files are correct by checking against a Known Good State database.

In the example of FIG. 5, a container IR and a virtual TPM per container exist, wherein the container IR may comprise file measurements of files operated on by the container 506. Additionally, on every virtual TPM extend command (file measurement triggered by the OS Integrity 510), the same measurement may be reproduced to a physical TPM 514 in order to secure the measurements with the hardware component. Specifically, the TPM pPCR holds measurements from multiple vTPMs (vPCRs).

Figure 6:
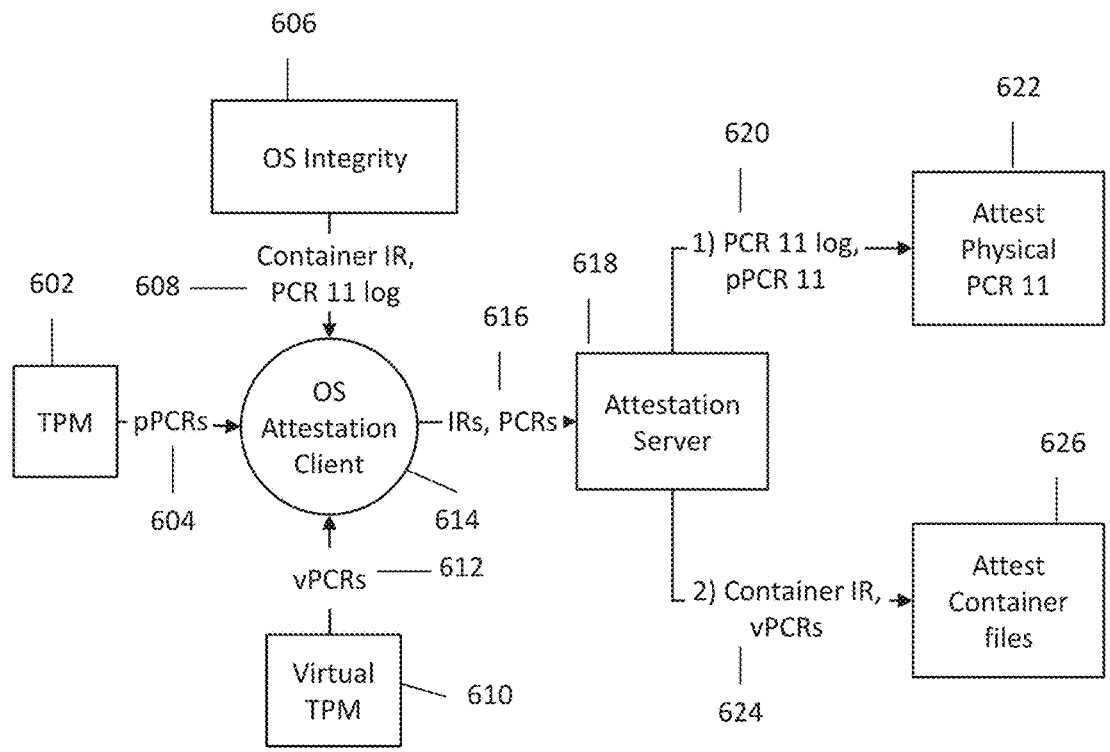
FIG. 6 is a logic diagram showing an example of modules performing associated functions to verify a container in the case of a launched container Integrity Report existing for each container launched in a system.

FIG. 6 is a logic diagram showing an example of modules performing associated functions to verify or attest a container in the case of a separate IR (a container integrity report, IR) is generated for each container.

FIG. 6 may be considered in the context of FIG. 5, in that the measurement of files, storage and protection of measurements, and creation of container IR 524 may occur prior to the method of FIG. 6 being performed.

As with FIG. 5, in the example of FIG. 6, the container IR contains measurements for files operated on by the container, and no other file measurements. The container IR of FIG. 5 may otherwise be known as an entity IR.

In the example logic diagram of FIG. 6, an OS attestation client 614 receives 608 a container IR 524 and the PCR Log 522 from the OS Integrity module 606. As an example, in FIG. 6 PCR 11 Log is received from the OS Integrity module 606. The OS attestation client 614 may receive 604 pPCRs from the TPM 602. The OS attestation client 614 may receive 612 vPCRs from the virtual TPM 610.

The OS attestation client 614 may be software for performing the attestation process. The OS attestation client 614 may be implemented on the server running the container 506 to be verified. The OS attestation client 614 may interface between the hardware of the system which may protect measurements and IRs, and software elements of the system. Alternatively, the measurements and IRs may be protected with software based techniques.

The OS attestation client 614 may communicate 616 the IRs and PCRs to an attestation server 618. The attestation server 618 may be a device or system for remotely performing attestation on an entity running on another device or system. Alternatively, the attestation server 618 may be implemented as part of the same device or system that is running the entity or container 506 to be verified.

The attestation server 618 may attest the physical PCR 622 by first checking 620 the PCR value against the final integrity value from the PCR log. Then, the attestation server 618 may verify that every container IR entry is present in the PCR log uniquely and with the same integrity value, which means the container log is also integral.

The attestation server 618 may attest 626 container files based on the container IR and vPCR 624. The vPCR 624 is provided as an example in FIG. 6, and the skilled person would readily understand that the container IR could be protected by any mechanisms known to the skilled person, including pPCR. The attestation server 618 may attest 626 the container files by comparison of the file measurements with expected values. The known measurement values may be stored in the attestation server 618, or retrieved from a separate database, for example. The attestation server 618 may receive the known file measurements from another device, and perform the comparison, or the attestation server 618 may output the file measurements in the container IR to another device to perform the comparison. The attestation server 618 may cross-check files referenced in the container IR with the first IR to verify that the container has operated on the expected files, and that the files were in the desired or correct state.

A verifier may verify a container based on the attestation procedures described above. If the attestation procedures are a success, the verifier can be confident that the container is running, or was ran, as expected.

In the examples presented above, a container image integrity report or a container integrity report is generated per container that is launched. However, as a further alternative, the containers may be grouped in any fashion, such that there may be a single container image IR or a container IR for a group of two or more containers, while at the same time permitting there to be multiple container image IRs or container IRs. The option for a mixture of container image IRs and container IRs is to be used in combination is not excluded. That is, the respective examples of FIGS. 3 and 4, and FIGS. 5 and 6 are not mutually exclusive.

In one example a computing device for integrity verification of an entity grouping a set of processes may comprise: a processor to: launch an entity for executing a function, the entity operating one or more files for executing the function; and in response to launching the entity: generate an entity image integrity report comprising, for one or more files operated by the entity, a reference to a file measurement in a first integrity report the first integrity report containing measurements of a plurality of files operable in one or more entities; or generate an entity integrity report corresponding to the launched entity, the entity integrity report comprising a file measurement for each of the files operated by the entity.

All of the features disclosed in this specification (including any accompanying claims, abstract, and drawings) may be combined in any combination, except combinations where some of such features are mutually exclusive.

Each feature disclosed in this specification, including any accompanying claims, abstract, and drawings), may be replaced by alternative features serving the same, equivalent, or similar purpose, unless expressly stated otherwise. Thus, unless expressly stated otherwise, each feature disclosed is one example of a generic series of equivalent or similar features.

The present teachings are not restricted to the details of any foregoing examples. Any novel combination of the features disclosed in this specification (including any accompanying claims, abstract, and drawings) may be envisaged. The claims should not be construed to cover merely the foregoing examples, but also any variants which fall within the scope of the claims.

The invention claimed is:

1. A non-transitory machine-readable storage medium storing instructions for integrity verification of an entity grouping a set of processes that, if executed by a physical processing element of a device, cause the device to:
    launch the entity for executing a function, the entity operating one or more files of a plurality of files, for executing the function;
    in response to launching the entity, to generate an entity image integrity report comprising, for the one or more files operated by the entity, a reference pointing to an entry in a first integrity report separate from the entity image integrity report,
    wherein the entry is a file measurement,
    wherein the first integrity report contains measurements of the plurality of files operable in one or more entities, wherein the measurements include one-way hash of a state of the one or more files; and
    verify the entity by comparing the entity image integrity report with one-way hashes of a predefined selection of files associated with execution of the function associated with the entity,
    wherein in response to the files referenced in the entity image integrity report matching a set of the predefined selection of files the entity is verified.

2. The non-transitory machine readable storage medium of claim 1, wherein the entity is a container.

3. The non-transitory machine readable storage medium of claim 1, further comprising instructions that, if executed by the physical processing element, cause the device to:
    protect the first integrity report by a Trusted Platform Module in a system in which the entity is launched.

4. The non-transitory machine readable storage medium of claim 1, wherein the first integrity report comprises:
    measurements of all files in a system in which the entity is launched.

5. The non-transitory machine readable storage medium of claim 1, further comprising instructions that, if executed by the physical processing element, cause the device to:
protect the entity image integrity report by a Trusted Platform Module in a system in which the entity is launched.

6. The non-transitory machine readable storage medium of claim 1, further comprising instructions that, if executed by the physical processing element, cause the device to:
measure the one or more files operated by the entity; and
update the first integrity report with the file measurements.

7. The non-transitory machine readable storage medium of claim 1, further comprising instructions that, if executed by the physical processing element, cause the device to:
update the entity image integrity report and the first integrity report when a file change is detected.

8. The non-transitory machine readable storage medium of claim 1, further comprising instructions that, if executed by the physical processing element, cause the device to:
generate the file measurements by performing a hashing function on a file.

9. A non-transitory machine-readable storage medium storing instructions for integrity verification of an entity grouping a set of processes that, if executed by a physical processing element of a device, cause the device to:
launch the entity for executing a function, the entity operating one or more files of a plurality of files, for executing the function;
in response to launching the entity, to generate an entity integrity report corresponding to the launched entity, the entity integrity report comprising a file measurement for each of the one or more files of the plurality of files operated by the entity, wherein each file measurement includes a one-way hash of a state of the one or more files;
further store file measurements comprised in the entity integrity report in a second integrity report along with file measurements in respect of files operated by other entities; and
verify the entity by comparing the entity image integrity report with one-way hashes of a predefined selection of files associated with execution of the function associated with the entity,
wherein in response to the files referenced in the entity image integrity report matching a set of the predefined selection of files the entity is verified.

10. The non-transitory machine readable storage medium of claim 9, wherein the entity is a container.

11. The non-transitory machine readable storage medium of claim 9, further comprising instructions that, if executed by the physical processing element, cause the device to:
protect the entity integrity report by a Trusted Platform Module in a system in which the entity is launched.

12. The non-transitory machine readable storage medium of claim 9, wherein the file measurements are generated by performing a hashing function on a file.

13. A method for integrity verification of an entity grouping a set of processes, the method comprising:
launching the entity for executing a function, the entity operating one or more files of a plurality of files, for executing the function;
in response to launching the entity:
generating an entity image integrity report comprising, for the one or more files operated by the entity, a reference pointing to an entry in a first integrity report separate from the entity image integrity report,
wherein the entry is a file measurement,
wherein the first integrity report contains measurements of the plurality of files operable in one or more entities, wherein the measurements include one-way hash of a state of the one or more files;
verifying the entity by comparing the entity image integrity report with one-way hashes of a predefined selection of files in order to execute the function associated with the entity,
wherein in response to the files referenced in the entity image integrity report matching a set of the predefined selection of files the entity is verified.

14. The method of claim 13, wherein the entity is a container.

15. The method of claim 13, further comprising a Trusted Platform Module to protect the first integrity report or the entity integrity report.

16. The method of claim 13,
wherein in response to the file measurements in the entity integrity report matching the file measurements of the predefined selection of files the entity is further verified.

17. The method of claim 13, wherein the predefined selection of files is based on a baseline state of the entity.

18. The non-transitory machine readable storage medium of claim 1, wherein the predefined selection of files in based on a baseline state of the entity.

19. The non-transitory machine readable storage medium of claim 9, wherein the predefined selection of files in based on a baseline state of the entity.

* * * * *